US009987876B1

United States Patent
Tuang

(10) Patent No.: US 9,987,876 B1
(45) Date of Patent: Jun. 5, 2018

(54) MULTI-TIERED EXPANDABLE FILING ASSEMBLY

(71) Applicant: EP Family Corp., Walnut, CA (US)

(72) Inventor: Bao-Yi Tuang, Walnut, CA (US)

( * ) Notice: Subject to any disclaimer, the term of this patent is extended or adjusted under 35 U.S.C. 154(b) by 0 days. days.

(21) Appl. No.: 15/469,410

(22) Filed: Mar. 24, 2017

(51) Int. Cl.

| | |
|---|---|
| ***B42F 17/00*** | (2006.01) |
| ***A47F 3/14*** | (2006.01) |
| ***A47J 47/00*** | (2006.01) |
| ***B42F 7/12*** | (2006.01) |
| ***A47B 45/00*** | (2006.01) |
| ***A47B 47/00*** | (2006.01) |
| ***A47B 96/02*** | (2006.01) |
| ***A47B 63/00*** | (2006.01) |
| ***A47B 57/12*** | (2006.01) |
| ***A47B 87/02*** | (2006.01) |
| ***A47B 57/14*** | (2006.01) |
| ***A47B 57/08*** | (2006.01) |

(52) U.S. Cl.

CPC ................ *B42F 7/12* (2013.01); *A47B 45/00* (2013.01); *A47B 47/0083* (2013.01); *A47B 57/08* (2013.01); *A47B 57/12* (2013.01); *A47B 57/14* (2013.01); *A47B 63/00* (2013.01); *A47B 87/0207* (2013.01); *A47B 96/021* (2013.01)

(58) Field of Classification Search

CPC ..... A47B 45/00; A47B 47/0083; A47B 63/00; A47B 96/021; A47B 57/06; A47B 57/08; A47B 57/10; A47B 57/12; A47B 57/14; A47B 57/32; A47B 57/34; A47B 57/36; A47B 57/38; A47B 96/02; A47B 96/024; A47B 87/02; A47B 87/0207; A47B 87/0261; A47B 87/0269; A47B 47/0091; A47B 47/03; A47B 57/18; A47B 57/20; A47B 57/22; A47B 57/40; A47B 57/44; A47F 5/13; A47F 5/0031; A47F 5/0043; A47F 5/0056; A47F 5/01

USPC ....... 211/11, 187, 126.13, 132.1, 133.1, 190, 211/133.5, 133.2, 153, 181.1, 188, 194, 211/126.9, 126.2; 108/96, 106, 144.11

See application file for complete search history.

(56) References Cited

U.S. PATENT DOCUMENTS 2,322,748 A * 6/1943 Shaw ................ A47B 87/0207 108/53.5
3,252,434 A * 5/1966 Young, Jr. ................ A47F 5/13 108/181

(Continued)

*Primary Examiner* — Jennifer E. Novosad
(74) *Attorney, Agent, or Firm* — Tommy SF Wang; Wang IP Law Group, P.C.

(57) ABSTRACT

A multi-tiered expandable filing assembly provides at least three modular trays arranged in stacked tiers and supported from two side by a pair of lateral frames. The modular trays receive, store, sort, and organize files, documents, and mail. The modular trays comprise a panel, a peripheral region, and at least one protrusion extending from the periphery. The protrusion extends from the sides of the panel and are configured to couple with the concave humps that form in the support bars of the lateral frames. The modular trays are arranged into three tiers and expanded to additional tiers of trays through constructive arrangement with the lateral frames. The lateral frames comprise a pair of legs, a top bar forming a top convex hump, and a bottom bar forming a bottom convex hump. The top and bottom convex humps from multiple assemblies can be stacked to further expand the assembly.

19 Claims, 6 Drawing Sheets

(56) References Cited

U.S. PATENT DOCUMENTS

| | | | | | |
|---|---|---|---|---|---|
| 3,490,393 | A * | 1/1970 | Nelson | A47B 57/14 | 108/109 |
| 3,592,345 | A * | 7/1971 | Featherman | F16B 12/34 | 108/107 |
| 3,680,712 | A * | 8/1972 | Jurasek | A47F 5/13 | 211/59.2 |
| 3,884,358 | A * | 5/1975 | Marschak | A47B 57/14 | 108/109 |
| 3,915,097 | A * | 10/1975 | Young, Jr. | A47F 5/12 | 108/163 |
| 3,977,529 | A * | 8/1976 | Stroh | A47F 5/135 | 108/181 |
| 4,231,298 | A * | 11/1980 | Pollack | A47B 57/14 | 108/181 |
| 4,288,130 | A * | 9/1981 | Baldwin | A47B 31/00 | 211/182 |
| 4,391,378 | A * | 7/1983 | Secon | A47F 5/13 | 108/109 |
| 4,778,066 | A * | 10/1988 | Stjernberg | A47B 55/02 | 211/181.1 |
| 4,805,785 | A * | 2/1989 | Pfeifer | A47B 87/0207 | 211/181.1 |
| 5,131,547 | A * | 7/1992 | Goldberg | A47F 5/13 | 108/166 |
| 5,172,816 | A * | 12/1992 | Kline | A47B 87/0207 | 211/194 |
| 5,251,973 | A * | 10/1993 | Hazan | A47B 61/00 | 610/186 |
| 5,351,842 | A * | 10/1994 | Remmers | A47B 96/028 | 108/152 |
| 5,718,441 | A * | 2/1998 | Kern | A47B 57/14 | 211/187 |
| 5,791,265 | A * | 8/1998 | Ellsworth | A47B 47/00 | 108/180 |
| 6,173,847 | B1 * | 1/2001 | Zellner, III | A47B 55/02 | 211/186 |
| 6,321,918 | B1 * | 11/2001 | Rollins | A47B 87/0207 | 211/194 |
| 6,520,095 | B1 * | 2/2003 | Hayes | A47B 47/047 | 108/190 |
| 8,025,163 | B2 * | 9/2011 | McAllister | A47B 96/028 | 108/42 |
| 8,196,761 | B2 * | 6/2012 | Morandi | A47B 96/021 | 108/181 |
| 8,267,261 | B2 * | 9/2012 | Vanderhoek | A01G 9/143 | 108/143 |
| 8,499,944 | B2 * | 8/2013 | Parks | F24C 15/16 | 126/339 |
| 8,616,138 | B1 * | 12/2013 | Fu | A47B 57/545 | 108/147.13 |
| D757,176 | S * | 5/2016 | Tsai | D19/92 | |
| 9,782,996 | B1 * | 10/2017 | Kuo | B42F 7/12 | |
| 2005/0103734 | A1 * | 5/2005 | Saltzberg | A47B 57/50 | 211/187 |
| 2007/0023376 | A1 * | 2/2007 | Black | A47B 47/025 | 211/187 |
| 2007/0108147 | A1 * | 5/2007 | Chen | A47B 47/00 | 211/187 |
| 2014/0353271 | A1 * | 12/2014 | Kruse | A47F 5/01 | 211/188 |
| 2015/0096953 | A1 * | 4/2015 | Lai | A47B 47/024 | 211/186 |
| 2015/0282613 | A1 * | 10/2015 | Chen | A47B 55/00 | 211/187 |

* cited by examiner

MULTI-TIERED EXPANDABLE FILING ASSEMBLY

FIELD OF THE INVENTION

The present invention relates generally to a multi-tiered expandable filing assembly. More so, the present invention relates to a filing assembly that provides at least three modular trays arranged in three stacked tiers that serve to for receive, store, sort, and organize files, documents, mails, and the like; whereby the modular trays comprises a panel, a peripheral region, and at least one protrusion extending from the periphery; whereby the modular trays may be arranged into at least three stacked tiers and expanded to add additional tiers of modular trays through constructive arrangement with a supportive pair of lateral frames; whereby the lateral frames comprise a pair of legs, a top bar that forms a top convex hump, a bottom bar that forms a bottom convex hump, and at least one support bar that is defined by a plurality of spaced-apart concave humps; whereby the protrusion extending from the peripheral region of the trays detachably and selectively couples to one of the concave humps that form in the support bar to provide support for the tray at a desired position relative to the lateral frames; whereby the trays can receive support between the pair of lateral frames, or to one side of the lateral frames; whereby the filing assembly can be assembled into multiple tiers of trays for greater filing capacity by adding additional trays across the lateral frames; and whereby the filing assembly can be flattened to a compact size during storage or transportation by detaching the trays from the lateral frames.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a file tray is used for receiving, storing, sorting or organizing files, documents, mails, and the like. A simple file tray can be an open-top box made of metal, wood, plastic or paperboard. A disadvantage of such a file tray with a permanent structure is that it must occupy an equal space during usage and non-usage, i.e., transportation or storage. Another disadvantage is that it normally requires additional means of support to stack up to each other.

In many instances, multiple file trays are constructed within a structure, which is divided into a fixed number of rows and columns of trays by internal partitions. The disadvantage of such arrangement is that user can not alter the size of entire structure or the number of trays for usage.

Often, wire trays and shelves consists of wire mesh supported by metal supports and is intended to be load-bearing. The mesh is usually welded to the supports, but may be attached in other ways as well. In commercial and industrial applications, the wire mesh usually has a minimum wire gauge when round wire is used.

Other proposals have involved stacked tiers of trays for receiving, storing, sorting, and organizing files, documents, mails, and the like. The problem with these filing systems is that they have limited space and surface area. Even though the above cited filing trays meet some of the needs of the market, a multi-tiered expandable filing assembly that provides at least three modular trays arranged in stacked tiers and supported from two side by a pair of lateral frames; whereby the modular trays receive, store, sort, and organize files, documents, mails, and the like; and whereby the multi-tiered expandable filing assembly can be expanded vertically through secure stacking of multiple assembly and modular trays, or expanded laterally through adjacent connections of modular trays on the same assembly, is still desired.

SUMMARY

Illustrative embodiments of the disclosure are generally directed to a multi-tiered expandable filing assembly. The filing assembly provides at least three modular trays arranged in three stacked tiers and supported from two side by a pair of lateral frames. The modular trays serve to receive, store, sort, and organize files, documents, mails, and the like. The multi-tiered expandable filing assembly can be expanded vertically through secure stacking of multiple assembly and modular trays, or expanded laterally through adjacent connections of modular trays on the same assembly.

In some embodiments, the at least three modular trays comprise a panel, a peripheral region, and at least one protrusion extending from the periphery. The panel may include a meshed, rigid panel sized to support a document, mail, and other general paper materials. The protrusion may include a disc that extends from the sides of the panel and are configured to couple with the concave humps that form in the support bars of the lateral frames. The modular trays may be arranged into at least three stacked tiers and expanded to add additional tiers of modular trays through constructive arrangement with the pair of lateral frames. The lateral frames comprise a pair of legs, a top bar that forms a top convex hump, a bottom bar that forms a bottom convex hump. The lateral frames utilize a coupling effect between convex humps that form along the length of the top and bottom bars to further stabilize the stacked configuration. Thus, the top and bottom convex humps are configured to enable stacking multiple lateral frames on top of each other, so as to expand the filing system.

The lateral frames further comprise at least one support bar that is defined by a plurality of spaced-apart concave humps. It is the support bar from two spaced apart lateral frames that provides direct support of the modular trays; and specifically the at least one protrusion extending from the peripheral region of the modular tray couples with the spaced-apart concave humps of the support bar.

Thus, in one embodiment, the protrusion extending from the peripheral region of the trays detachably and selectively couples to one of the concave humps that form in the support bar to provide support for the tray at a desired position relative to the lateral frames. In alternative embodiments, various fasteners, friction fit coupling arrangements, and the like may be used to join the modular trays with the at least one support bar.

The filing assembly further comprises a pair of cross bars configured to connect one leg from each lateral frame, so as to help support the at least three panels and enhance the structural integrity of the filing assembly.

The modular trays can be stacked in various arrangements off each other or off the lateral frames. In one embodiment, the modular trays can receive support between the pair of lateral frames, or to one side of the lateral frames. This creates a lateral expansion of the filing system. In one embodiment, the modular trays are stacked in a vertical stacked configuration. In another embodiment, two lateral frames can support a single modular tray.

The filing assembly can be assembled into multiple tiers of trays for greater filing capacity by adding additional trays across the lateral frames. This creates a vertical expansion of the filing system. Further, the filing assembly can be flattened to a compact size during storage or transportation by detaching the trays from the lateral frames.

In one aspect, a multi-tiered expandable filing assembly, comprises:

at least three modular trays comprising a panel having a peripheral region;

at least one protrusion extending from the peripheral region of the panel;

a pair of lateral frames configured to support the at least three modular trays, the pair of lateral frames comprising a pair of legs, a top bar defined by a top convex hump, a bottom bar defined by a bottom convex hump, and at least one support bar defined by a plurality of spaced-apart concave humps, and at least one support bar defined by a plurality of spaced-apart concave humps, the plurality of spaced-apart concave humps configured to detachably couple with the at least one protrusion, whereby the at least three modular trays are supported between the pair of lateral frames, or form one side of the pair of lateral frames; and a pair of cross bars extending between the pair of lateral frames.

In another aspect, the at least three modular trays are disposed in a parallel, spaced-apart relationship.

In another aspect, the panel is meshed.

In another aspect, the panel has a generally rectangular shape.

In another aspect, the peripheral region is reinforced metal.

In another aspect, the peripheral region comprises a flange.

In another aspect, the pair of legs are disposed in a spaced-apart parallel relationship.

In another aspect, the pair of legs form an elongated rectangular shape.

In another aspect, the at least one protrusion comprises two discs connected with a rod.

In another aspect, the at least one protrusion comprises four protrusions.

In another aspect, the top convex hump is configured to mate with the bottom convex hump in a friction fit relationship.

In another aspect, the at least one support bar is generally perpendicular to the pair of legs.

In another aspect, the plurality of spaced-apart concave humps comprises four concave humps disposed in a spaced-apart relationship.

In another aspect, the four concave humps disposed in a spaced-apart relationship comprises two sets of adjacent concave humps at opposite ends of the at least one support bar.

In another aspect, the pair of cross bars connect to one leg from each lateral frame.

In another aspect, the pair of cross bars have an X-shaped relationship.

One objective of the present invention is to receive, store, sort, and organize files, documents, mails, and the like on a tiered arrangement of modular trays.

Another objective is to expand the size of the filing assembly by stacking multiple filing systems on top of each other.

Another objective is to expand the size of the filing assembly by adding modular trays to the adjacently to each other.

Yet another objective is to assembly multiple modular trays, and stack multiple filing assemblies with minimal amount of tools and fasteners.

Another objective is to provide an inexpensive to manufacture filing assembly.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A multi-tiered expandable filing assembly 100 is referenced in FIGS. 1-6. The multi-tiered expandable filing assembly 100, hereafter "assembly 100", provides at least three modular trays 102*a-d* arranged in a stacked tier arrangement and supported from two side by a pair of lateral frames 112*a*, 112*b*. The modular trays 102*a-d* serve to receive, store, sort, and organize files, documents, mails, and the like. The assembly 100 can be expanded vertically through secure stacking of multiple assemblies and modular trays 102*a-d*, or expanded laterally through adjacent connections of modular trays 102*b*, 102*d* on the same assembly 100. In operation, at least three modular trays 102*a-d* are arranged in a parallel, spaced-apart relationship for securely retaining documents and office related material known in the art. The assembly 100 may be disassembled for flat stowage and shipping with minimal tools and fasteners.

Figure 1:
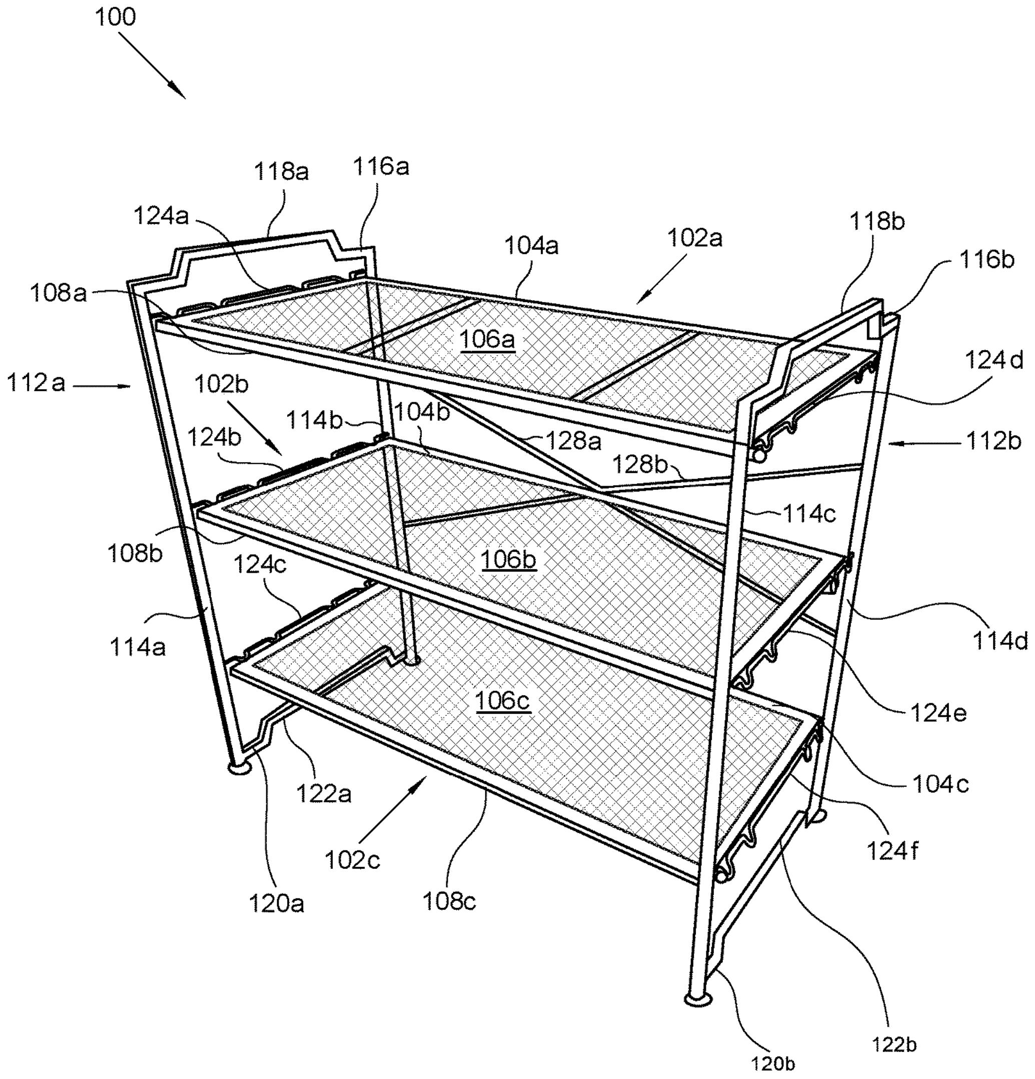
FIG. 1 illustrates a front perspective view of an exemplary multi-tiered expandable filing assembly, in accordance with an embodiment of the present invention.

As referenced in FIG. 1, the assembly 100 comprises at least three modular trays 102*a-c*. Each modular tray 102*a-c* comprises a panel 106*a-d* and a peripheral region 104*a-c* that is reinforced and may form a flange 108*a-c*. In some embodiments, the panel 106*a-d* may include a meshed, rigid panel that is sized and dimensioned to support a document, mail, and other general office materials.

In some embodiments, the modular trays 102*a-c* may be arranged into at least three stacked tiers and expanded to add additional tiers of modular trays 102*d* through constructive arrangement with the pair of lateral frames 112*a*, 112*b*. For example, two or more modular trays 102*b*, 102*d* may be fastened adjacently to each other.

The lateral frames 112*a*, 112*b* comprise a pair of legs 114*a-d* that support the assembly 100 in a generally vertical, upright position. The lateral frames 112*a*, 112*b* further comprise a top bar 116*a*, 116*b* that forms a top convex hump 118*a*, 118*b*, and a bottom bar 120*a*, 120*b* that forms a bottom convex hump 122*a*, 122*b*. The lateral frames 112*a*, 112*b* utilize a coupling effect between the top and bottom convex humps 118*a-b*, 122*a-b* that form along the length of the top and bottom bars 116*a-b*, 122*a-b* to further stabilize the stacked configuration. Thus, the top and bottom convex humps 116*a-b*, 122*a-b* are configured to enable stacking multiple lateral frames 112*a*, 112*b* on top of each other, so as to expand the assembly 100.

Figure 2:
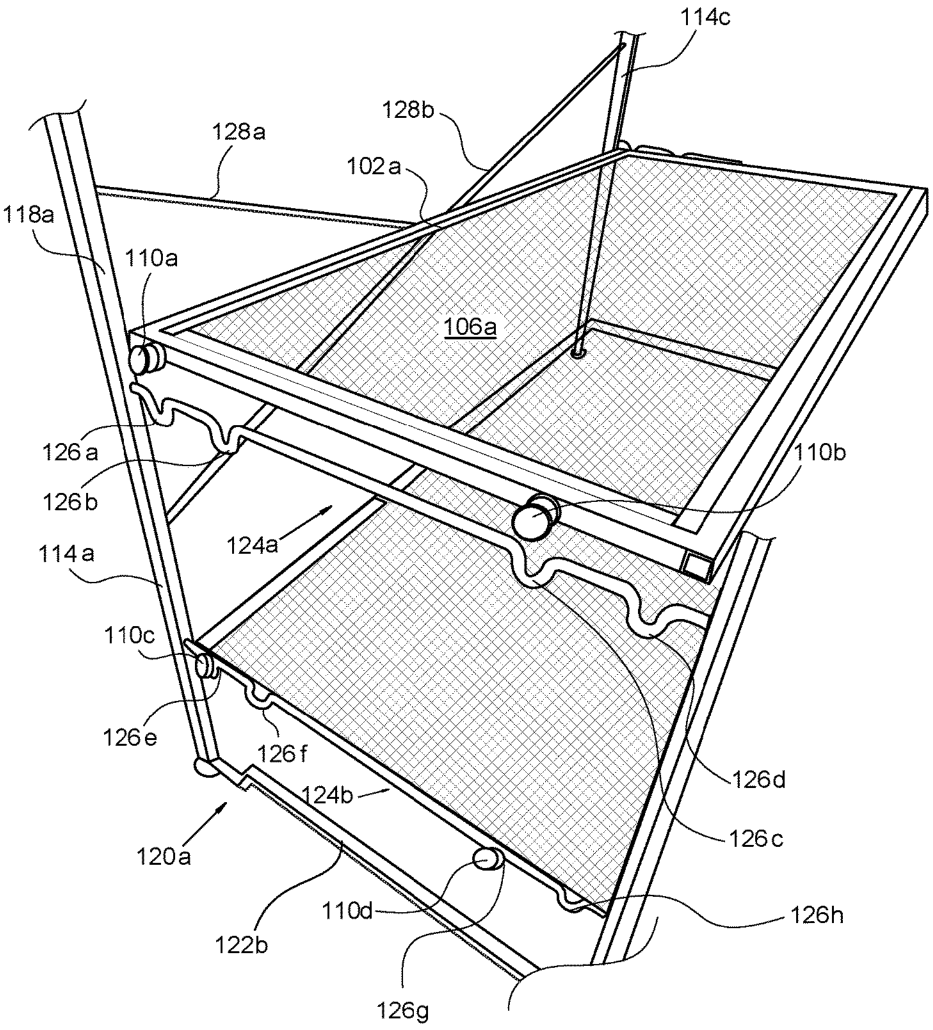
FIG. 2 illustrates a left side perspective view of the multi-tiered expandable filing assembly shown in FIG. 1, where an exemplary modular tray is being detached from an exemplary support bar, in accordance with an embodiment of the present invention.

As illustrated in FIG. 2, the lateral frames 112*a*, 112*b* further comprise at least one support bar 124*a-f* that is defined by a plurality of spaced-apart concave humps 126*a-h*. It is the support bar 124*a-f* that provides direct support of the modular trays 102*a-d*; and specifically the at least one protrusion 10*a-d* extending from the peripheral region 104*a-d* of the modular tray couples with the spaced-apart concave humps 126*a-h* of the support bar 124*a-f*. In one embodiment, each lateral frame 112*a*, 112*b* has three support bars 124*a-c*, 124*d-f*.

At least one protrusion 110*a-d* extends from the peripheral region 104*a-c*. The protrusion 110*a-d* may include a disc that extends from the sides of the panel 106*a-d*. The protrusion 110*a-d* is configured to couple with the concave humps 126*a-h* that form in one of a plurality of support bars 124*a-f* from the pair of lateral frames 112*a*, 112*b*.

Figure 3:
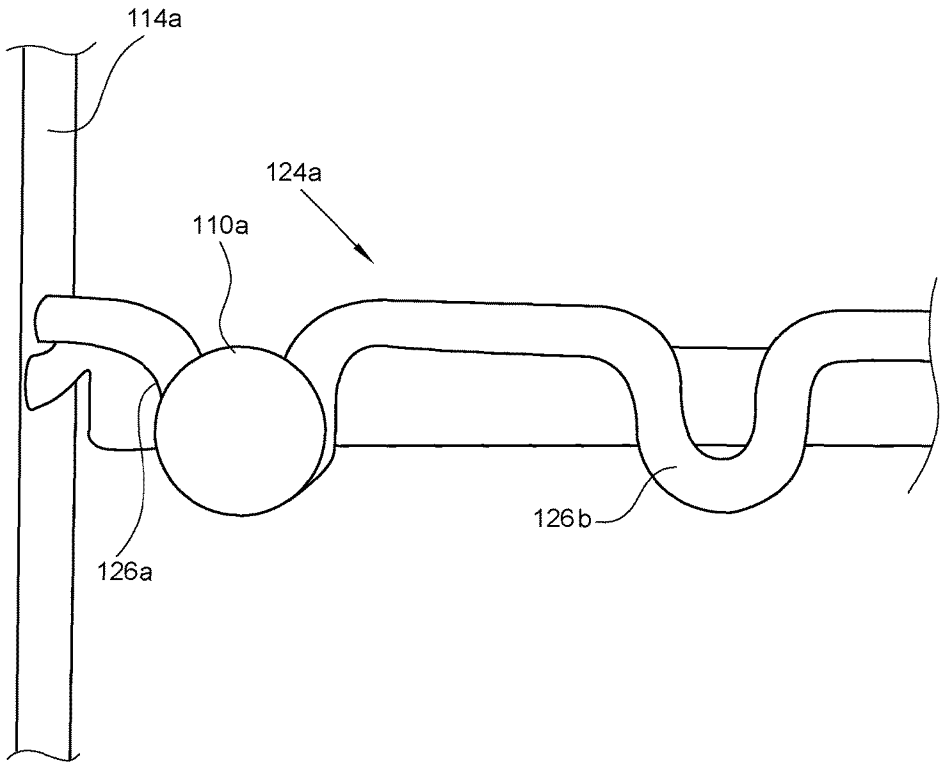
FIG. 3 illustrates a close up view of an protrusion coupling to an exemplary concave hump formed on the support bar, in accordance with an embodiment of the present invention.

Thus, as the close up in FIG. 3 illustrates, the at least one protrusion 110*a-d* that extends from the peripheral region 104*a* of the tray 102*a* detachably and selectively couples to one of the concave humps 126*a* that form in the support bar 124*a*. This provides support for the modular tray 102*a* at a desired position relative to the lateral frames 112*a*, 112*b*. In some embodiments, the protrusion 110*a-d* can be shifted along the length of the support bar 124*a* to couple to different concave humps 126*a*, 126*b*, 126*c*, 126*d*, so as to achieve a desired arrangement of modular trays 102*a-d*. In alternative embodiments, various fasteners, friction fit coupling arrangements, and the like may be used to join the modular trays 102*a-d* with the at least one support bar 124*a-f*.

Looking back at FIG. 1, the assembly 100 further comprises a pair of cross bars 128*a*, 128*b* configured to connect one leg from each lateral frame 112*a*, 112*b*. The cross bars 128*a*, 128*b* are effective for enhancing the structural integrity of the filing assembly 100, and thus supporting the at least three panels 106*a-c*. The pair of cross bars 128*a*, 128*b* connect to one leg 114*a*, 114*d* from each lateral frame 112*a*, 112*b*. The pair of cross bars 128*a*, 128*b* have an X-shaped relationship. The cross bars 128*a*, 128*b* are configured to provide structural integrity to the assembly 100.

Figure 5:
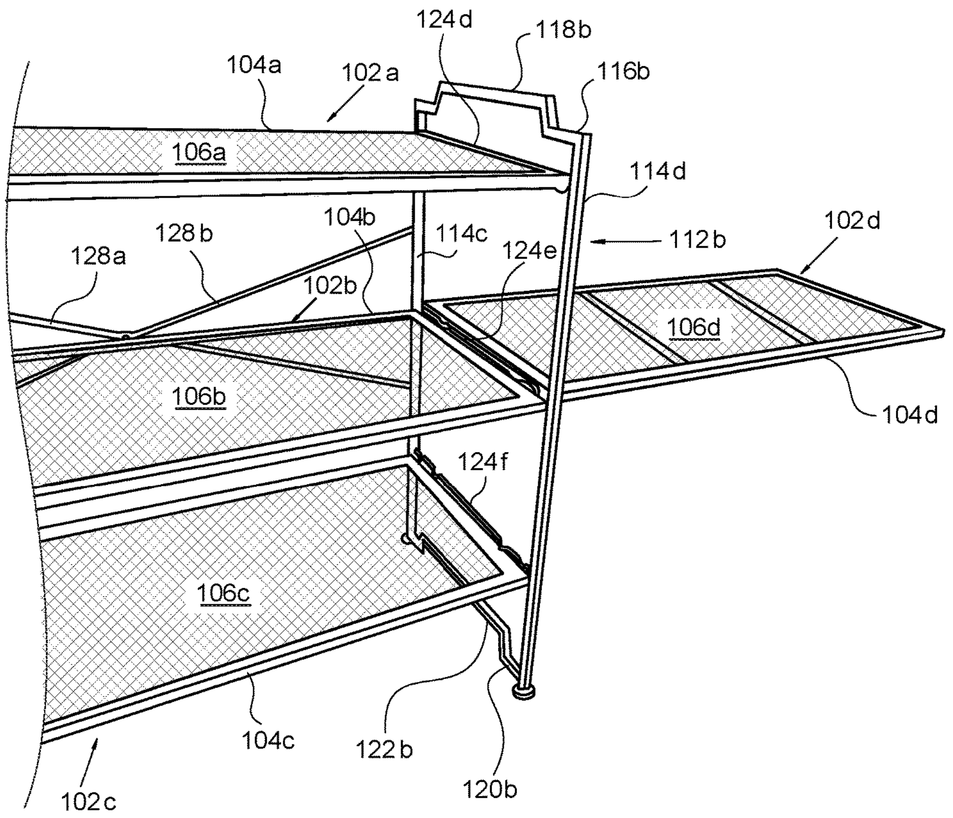
FIG. 5 illustrates a first modular tray connected between a pair of lateral frames by coupling two protrusions with a first set of two concave humps, and a second modular tray connected to the side of one of the lateral frames by coupling two protrusions with a second set of two concave humps on the same support bar, in accordance with an embodiment of the present invention.

In some embodiments, the modular trays 102*a-d* may be stacked in various arrangements off each other or in conjunction with the lateral frames 112*a*, 112*b*. In one embodiment, the modular trays 102*a-d* can receive support between the pair of lateral frames 112*a*, 112*b*. However, the modular tray 102*d* can also be supported on one side of one lateral frame 112*a* (FIG. 5). This lateral arrangement of modular trays 102*b*, 102*d* creates a lateral expansion of the assembly 100.

In another embodiment, the modular trays 102*a-c* are stacked in a vertical stacked configuration. In another embodiment, two lateral frames 112*a*, 112*b* can support a single modular tray 102*a*. In some embodiments, the assembly 100 can be assembled into multiple tiers of trays 102*a-c* for greater filing capacity by adding additional assemblies on top of the lateral frames 112*a*, 112*b*; whereby the top and bottom convex humps 118*a-b*, 122*a-b* couple together. This creates a vertical expansion of the assembly 100.

In yet another configurable arrangement of the assembly 100, the modular trays 102*a-d* and the lateral frames 112*a*, 112*b* can be disassembled and flattened to a compact size during storage or transportation. Thus, the modular trays 102*a-d* disconnect from the lateral frames 112*a*, 112*b* to form a fully collapsed position. In this position, the assembly 100 may be stowed and carried more easily. The generally flat shape of the fully collapsed assembly 100 also enables multiple modular trays 102*a-d* and lateral frames 112*a*, 112*b* to be packed and shipped more easily.

Looking once again at FIG. 1, the assembly 100, comprises at least three modular trays 102*a-c*. Each tray 102*a-c* comprises a panel 106*a-c* defined by a peripheral region 104*a-c*. The three modular trays 102*a-c* may be disposed in a parallel, spaced-apart relationship. In one embodiment, the panel 106*a* is meshed and has a generally rectangular shape. In another embodiment, the peripheral region 104*a* is reinforced metal and forms a flange 108*a*. The flange 108*a* may form on a front edge of the panel 106*a*, so as to restrict rolling and undesired movement of the documents and objects on the tray 102*a*. In one embodiment, the flange 108*a* may be oriented upwardly.

In another embodiment, the panels 106*a-d* are defined by a wire mesh. In another embodiment, the wire mesh that makes up the panels 106*a-d* may cross longitudinally, transversely, or in an X pattern. The wire mesh of the panels 106*a-d* are configured to enable supporting documents in a load bearing manner. In one embodiment, the wire mesh has a minimum wire gauge of 0.05", and may include a rigid, but lightweight metal such as aluminum, or a lightweight polymer.

Figure 4:
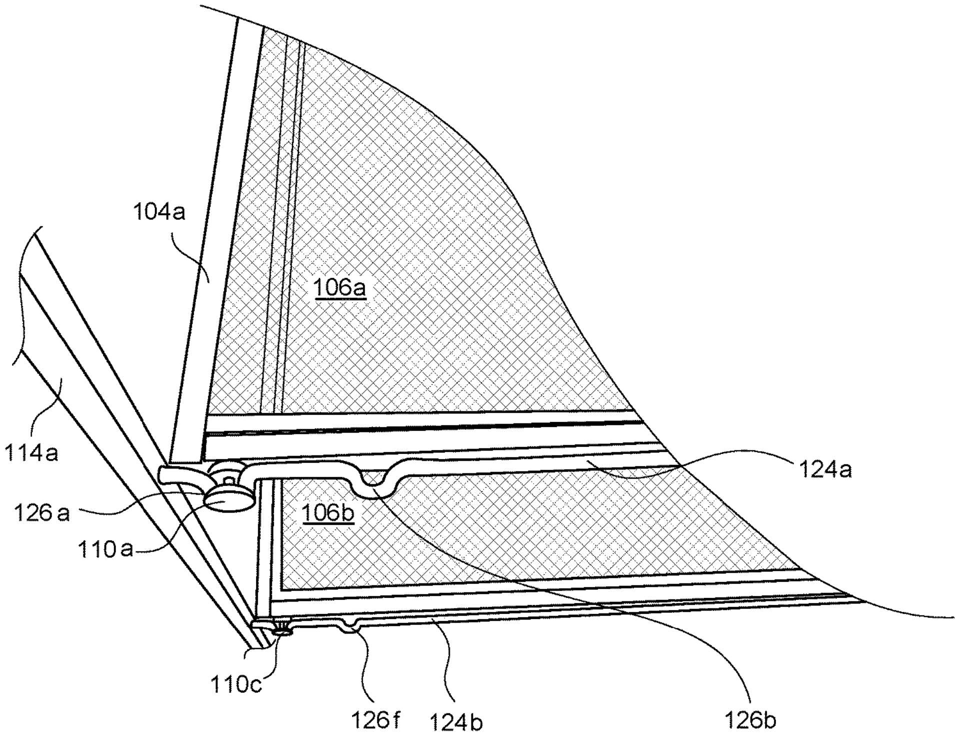
FIG. 4 illustrates an upper angle perspective view of two modular trays connected to two support bars on a lateral frame, in accordance with an embodiment of the present invention.

Turning now to FIG. 4, the assembly 100 may include at least one protrusion 110*a-d* extending from the peripheral region 104*a-d* of the panel 106*a-d*. In some embodiments, the at least one protrusion 110*a-d* comprises two discs connected with a rod. The rod is sized to fit snugly in one of the concave humps 126*a* that forms in the support bar 124*a*. In some embodiments, four protrusion 110*a-ds* may be used, with two protrusions 110*a*, 110*b* extending from each side of a panel 106*a*.

In some embodiments, the assembly 100 may include a pair of lateral frames 112*a*, 112*b* configured to support the at least three modular trays 102*a-d*. The lateral frames 112*a*, 112*b* comprise a pair of legs 114*a-d* that provide vertical support to the trays 102*a-d*. The legs 114*a-d* are disposed in a spaced-apart parallel relationship. In one embodiment, the legs 114*a-d* form an elongated rectangular shape. Though other shapes and dimensions may be used that provide support to the assembly 100.

The lateral frames 112*a*, 112*b* are further defined by a top bar 116*a*, 116*b* and a bottom bar 120*a*, 120*b* that cross between the pair of legs 114*a-d*. The top bar 116*a*, 116*b* is defined by a top convex hump 118*a*, 118*b*. The bottom bar 120*a*, 120*b* is defined by a bottom convex hump 122*a*, 122*b*. The convex humps 118*a-b*, 122*a-b* are defined as rising towards the top bar 116*a*, 116*b*. In one embodiment, the top convex hump 118*a*, 118*b* of a first assembly is configured to mate with the bottom convex hump 122*a*, 122*b* of a second assembly in a friction fit relationship. This allows multiple assemblies to be stacked, so as to expand the capacity to store, organize, and file documents on additional modular trays 102*a-d*.

Figure 6:
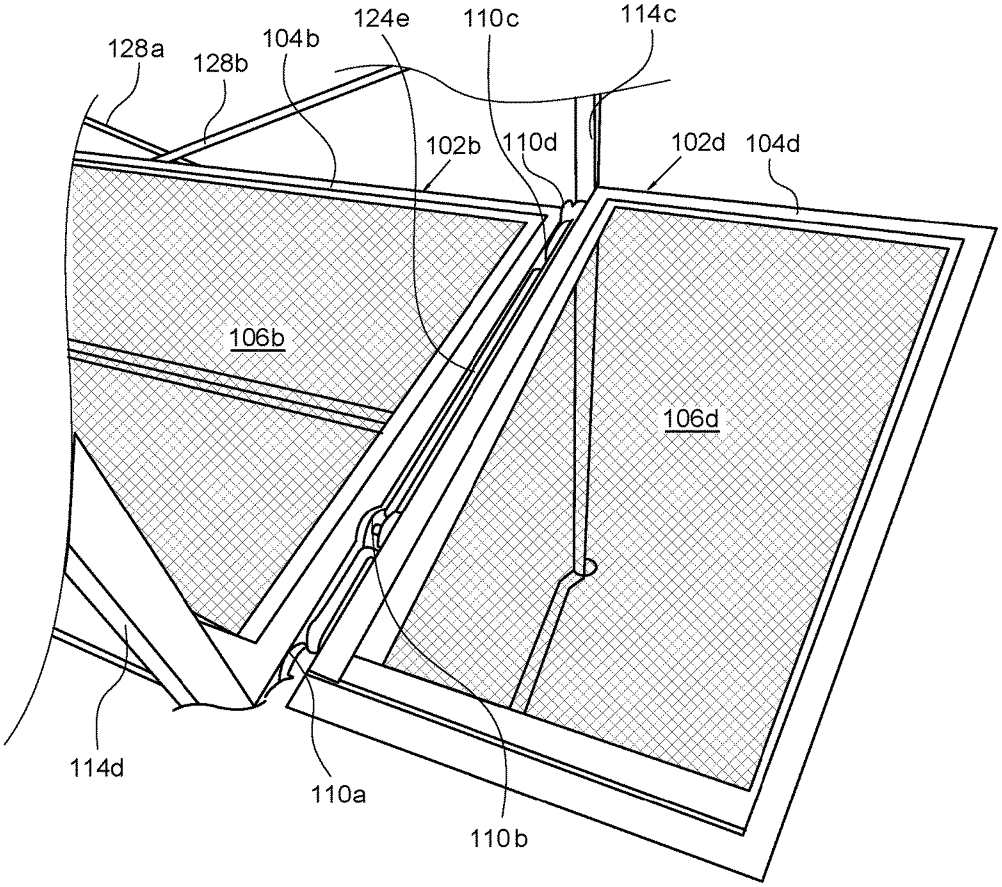
FIG. 6 illustrates a close up view of the first and second modular trays connected to the same support bar, in accordance with an embodiment of the present invention.

FIG. 5 illustrates yet another arrangement of trays 102*b*, 102*d*. Here, the trays 102*a-d* are shown in both a vertical, stacked arrangement, and a lateral arrangement. For example, a first modular tray 102*b* connects between the pair of lateral frames 112*a*, 112*b* by coupling two protrusions 110*a*, 110*b* with a first set of two concave humps 126*a*, 126*c*, and a second modular tray 102*d* connects to the side of one of the lateral frames 112*a*, 112*b* by coupling two protrusions 110*c*, 110*d* with a second set of two concave humps 126*b*, 126*d* on the same support bar 124*a*. In this lateral arrangement, two modular trays 102*a*, 102*b* are positioned adjacently to each other, as shown in FIG. 6. Additionally, the coupling effect between the protrusions 110*a-d* and the concave humps 126*a-h* works to create structural integrity in the assembly 100.

The lateral frames 112*a*, 112*b* further comprise at least one support bar 124*a-f* defined by a plurality of spaced-apart concave humps 126*a-h*. The concave humps 126*a-h* are defined as falling towards the bottom bar 120*a*, 120*b*. Though the orientation of the humps 118*a-b*, 122*a-b*, 126*a-h* may be reversed in alternative embodiments. The support bar 124*a-f* is generally perpendicular to the legs 114*a-d*, extending therebetween.

The spaced-apart concave humps 126*a-h* that form on the support bars 124*a-f* are configured to detachably couple with the at least one protrusion 110*a-d*. This relationship enables a connection to form between the modular trays 102*a-d* and the lateral frames 112*a*, 112*b*. In one embodiment, the protrusions 110*a-d* mate with the concave humps 126*a-h* in a friction fit relationship. Additionally, the coupling effect between the concave humps 126*a-h* and the protrusions 110*a-d* works to create structural integrity between the modular trays 102*a-d* and the lateral frames 112*a*, 112*b*.

In one embodiment, the plurality of spaced-apart concave humps 126*a-h* comprises four concave humps 126*a-d* disposed in a spaced-apart relationship, and extending across a support bar 124*a*. The protrusion 110*a-d* can be selectively coupled with a desired concave hump 126*a-h* to achieve a desired arrangement of modular trays 102*a-d* on the lateral frames 112*a*, 112*gb*. In this manner, the modular trays 102*a-d* are supported between a pair of lateral frames 112*a*, 112*b*, or receive support from one side of a lateral frames 112*a*.

In some embodiments, the assembly 100 may include a pair of cross bars 128*a*, 128*b* extending between the pair of lateral frames 112*a*, 112*b*. The pair of cross bars 128*a*, 128*b* connect to one leg 114*a*, 114*d* from each lateral frame 112*a*, 112*b*. The cross bars 128*a*, 128*b* may form a generally X-shaped relationship. The cross bars 128*a*, 128*b* are configured, chiefly to provide structural integrity to the assembly 100.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A multi-tiered expandable filing assembly, the assembly comprising:
- at least three modular trays each comprising a panel having a peripheral region;
- at least two protrusions extending from opposite sides of the peripheral region of each of the panels;
- a pair of lateral frames configured to support the at least three modular trays, the pair of lateral frames comprising a pair of legs, a top bar defined by a top convex hump, a bottom bar defined by a bottom convex hump, and at least one support bar defined by a plurality of spaced-apart concave humps, the plurality of spaced-apart concave humps configured to detachably couple with the at least two protrusions,
- whereby the at least three modular trays are supported between the pair of lateral frames; and
- a side tray coupled with one side of the pair of lateral frames.

2. The assembly of claim 1, further comprising a pair of cross bars extending between the pair of lateral frames.

3. The assembly of claim 2, wherein the pair of cross bars connect to one leg from each lateral frame.

4. The assembly of claim 3, wherein the pair of cross bars form a generally X-shape.

5. The assembly of claim 1, wherein the at least three modular trays are disposed in a parallel, spaced-apart relationship.

6. The assembly of claim 1, wherein the panel is meshed.

7. The assembly of claim 1, wherein the panel has a generally rectangular shape.

8. The assembly of claim 1, wherein the peripheral region comprises reinforced metal.

9. The assembly of claim 1, wherein the peripheral region comprises a flange.

10. The assembly of claim 1, wherein the pair of legs are disposed in a spaced-apart parallel relationship.

11. The assembly of claim 1, wherein the pair of legs form an elongated rectangular shape.

12. The assembly of claim 1, wherein each of the at least two protrusions comprises two discs connected with a rod.

13. The assembly of claim 1, wherein the at least two protrusions comprises four protrusions.

14. The assembly of claim 1, wherein the at least one support bar is generally perpendicular to the pair of legs.

15. The assembly of claim 1, wherein the plurality of spaced-apart concave humps comprises four concave humps disposed in a spaced-apart relationship.

16. The assembly of claim 15, wherein the four concave humps disposed in a spaced-apart relationship comprises two sets of adjacent concave humps at opposite ends of the at least one support bar.

17. A multi-tiered expandable filing assembly, the assembly comprising:

at least three modular trays each comprising a panel having a peripheral region;

at least two protrusions extending from opposite sides of the peripheral region of each of the panels;

a pair of lateral frames configured to support the at least three modular trays, the pair of lateral frames comprising a pair of legs, a top bar defined by a top convex hump, a bottom bar defined by a bottom convex hump, and at least one support bar defined by a plurality of spaced-apart concave humps, the plurality of spaced-apart concave humps configured to detachably couple with the at least two protrusions, whereby the at least three modular trays are supported between the pair of lateral frames;

a side tray coupled with one side of the pair of lateral frames; and a pair of cross bars extending between the pair of lateral frames, the pair of cross bars connect to one leg from each lateral frame.

18. The assembly of claim 17, wherein the peripheral region comprises a flange.

19. A multi-tiered expandable filing assembly, the assembly consisting essentially of:

at least three modular trays each comprising a meshed panel having a peripheral region, the peripheral region comprises a flange;

at least two protrusions extending from opposite sides of the peripheral region of each of the meshed panels;

a pair of lateral frames configured to support the at least three modular trays, the pair of lateral frames comprising a pair of legs, a top bar defined by a top convex hump, a bottom bar defined by a bottom convex hump, and at least one support bar defined by a plurality of spaced-apart concave humps, the plurality of spaced-apart concave humps configured to detachably couple with the at least two protrusions, whereby the at least three modular trays are supported between the pair of lateral frames or coupled with one side of the pair of lateral frames; and a pair of cross bars extending between the pair of lateral frames, the pair of cross bars connect to one leg from each lateral frame, the pair of cross bars forming a generally X-shape.

* * * * *